May 13, 1958 R. E. DAWSON 2,834,462
PNEUMATIC MATERIAL SEPARATION
Filed Sept. 12, 1955 3 Sheets-Sheet 1
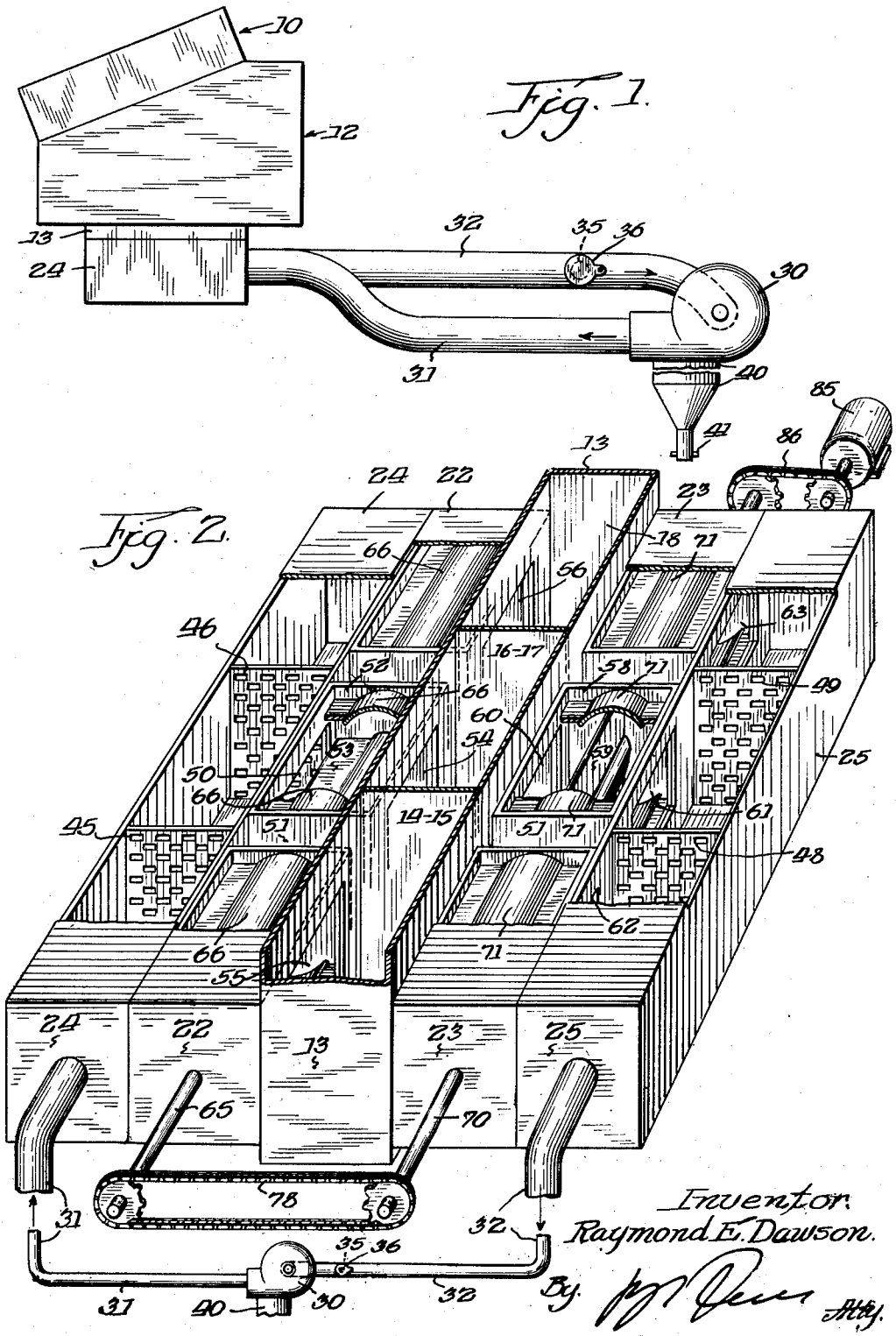

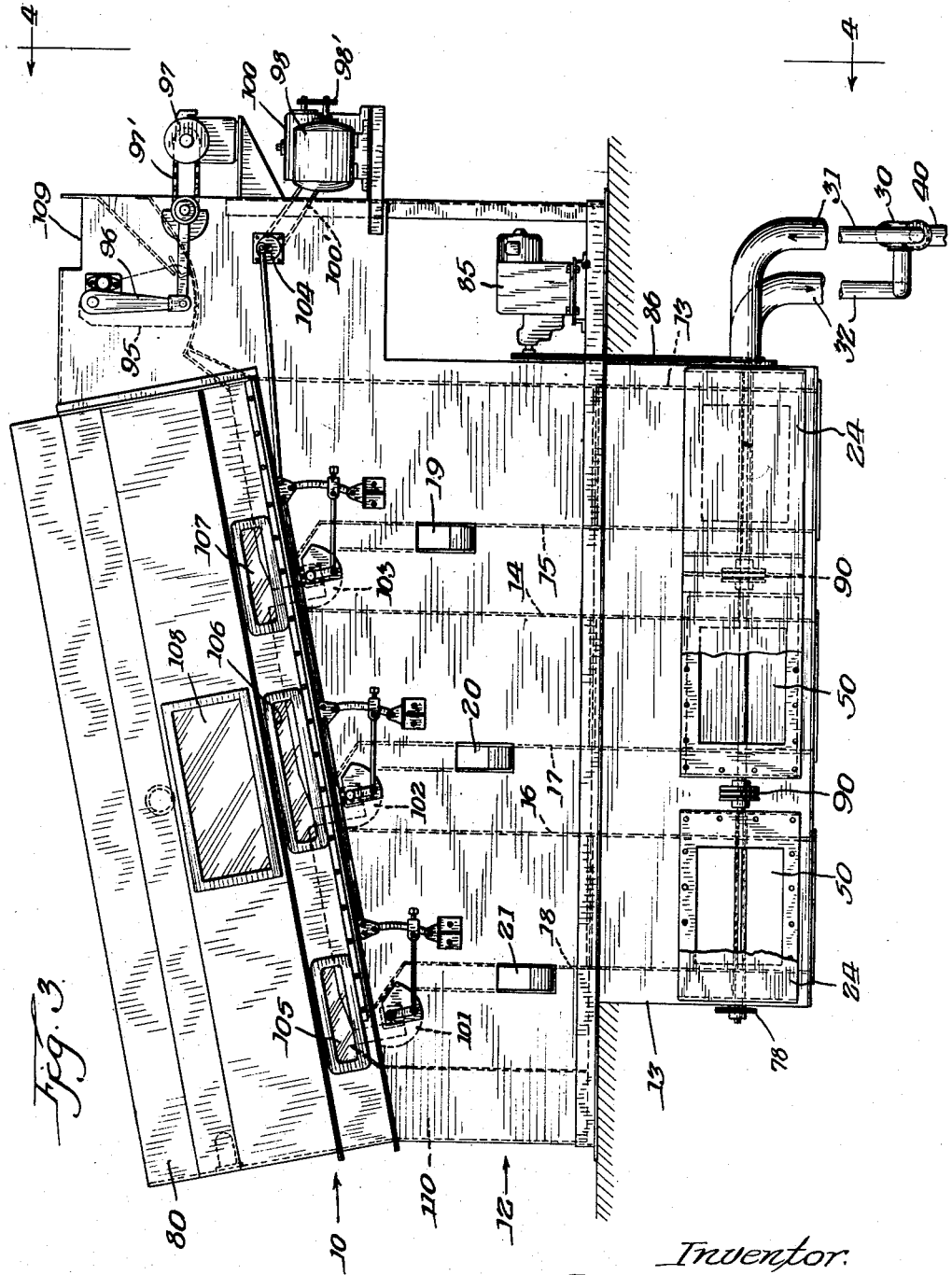

May 13, 1958  R. E. DAWSON  2,834,462
PNEUMATIC MATERIAL SEPARATION
Filed Sept. 12, 1955  3 Sheets-Sheet 3
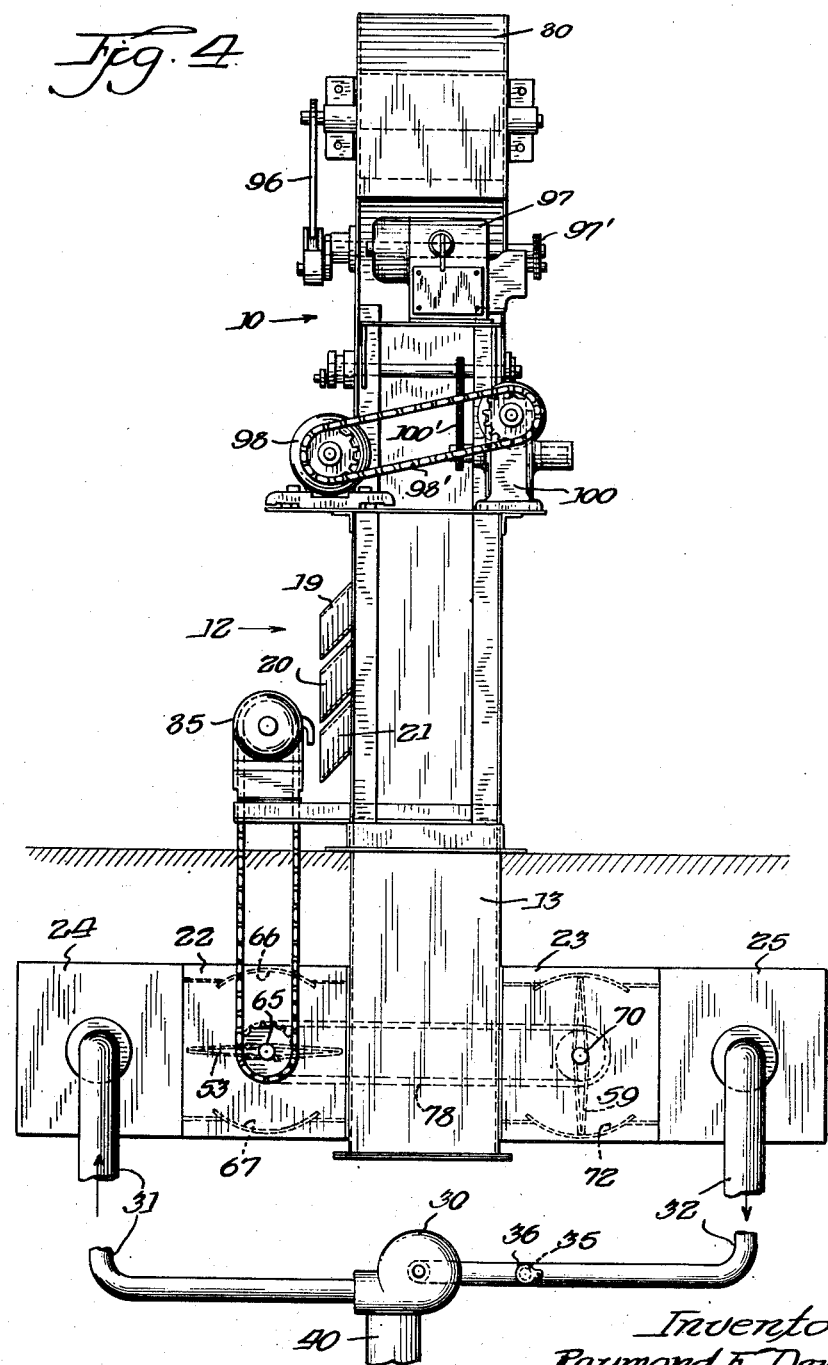

United States Patent Office 2,834,462
Patented May 13, 1958

2,834,462

PNEUMATIC MATERIAL SEPARATION

Raymond E. Dawson, Riverdale, Ill., assignor to Thompson-Starrett Company, Inc., Chicago, Ill., a corporation of Delaware Application September 12, 1955, Serial No. 533,712

14 Claims. (Cl. 209—475)

This invention relates to the art of classifying or separating heterogeneously intermixed material particles, and is particularly concerned with a method and an apparatus for producing air impulses for agitating material particles flowing along the deck or decks of an air separator to effect stratification of the particles in accordance with the specific gravities thereof. To give an example, the separator may, for example, be an airflow coal separator of the type disclosed in U. S. Patent No. 2,513,960 dated July 4, 1950.

The airflow separator described in the above noted patent is provided with a deck comprising a plurality of successively disposed inclined air pervious mechanically agitated deck sections separated by intermediate discharge chutes. Raw coal including impurities such as rock, slate, middlings and the like, which are to be separated from the coal, is delivered to the elevated end of the rearmost feed receiving deck section, forming on the successive deck sections a bed moving therealong for separation thereon. Air impulses are delivered to the successive deck sections from an air chamber disposed underneath to agitate the material particles contained in the moving bed, so as to keep the bed fluid and to cause stratification of the particles in accordance with their specific gravities. Heavy particles, for example, rock and slate and the like orient themselves at the bottom of the bed moving along the feed receiving deck section for removal as waste by way of the first intermediate discharge chute following such deck section; lighter particles including middlings stratify at the bottom of the bed moving along the second deck section for discharge as waste or, as the case may be, for recirculation, by way of the second intermediate discharge chute. The operation may in this manner continue over one or more successive deck sections, until substantially all impurities are separated from the lightest constituent, coal, which moves along the last frontally disposed deck section for discharge. The air impulses are produced by a rotating valve disposed in an air feed duct connected with the air chamber, such air feed duct being supplied with air by a fan. The decks or deck sections are enclosed by a dust hood which is by means of an air exhaust duct connected with a suitable separator, for example, of the cyclone type, such separator withdrawing the dust laden air, separating the fine and dust particles entrained therein, and discharging such particles to a dust collector.

It will be observed that the air circuit in this known separator system comprises injection of air impulses into the air chamber disposed underneath the decks or deck sections, such air impulses permeating through the material bed flowing along the deck sections and exerting a lifting action on the material particles therein to assist in the stratification thereof, the spent air from such impulses flowing upwardly into the dust hood, carrying along dust and fines and being withdrawn from the dust hood by the cyclone separator which precipitates the dust and fines into a dust hopper for discharge as waste or for recirculation, in whole or in part, as the case may be, thus cleaning the air and if desired, recirculating the cleaned air to the airflow separator in the impulsing manner described. The air impulse flow accordingly, in a manner of speaking, is in the prior system a one-way unidirectional flow, involving injection of air (impulses) into the material bed from underneath, flow of the air (impulses) through the material bed into the dust hood, and discharge flow of the air with entrained fines and dust particles from the dust hood to and through the cyclone separator. The provision of a dust separator is expensive and requires a great deal of floor space.

The invention proposes to eliminate the dust separator, thereby saving hundreds of square feet of valuable floor space and considerably reducing the initial cost as well as operating and maintenance expenses, and further proposes to improve the operation of the airflow separator. The invention is realized by the provision of novel features the more important of which are summarized below.

One feature of the invention provides for alternate air pressure and pressure relaxation impulses, in relatively rapid succession, above and below the decks or deck sections, to effect stratification of the material particles in the bed moving along said decks or deck sections. As compared with the one-way unidirectional air flow of the prior system, the invention thus provides an impulsing air flow alternately into and from the material bed, which is, in a manner of speaking, a two-way reciprocating impulsing air flow so far as the material particles in the bed are concerned. This manner of impulsing improves the separation of the material particles.

The two-way reciprocating impulsing air flow is in accordance with another feature of the invention effected by successively alternately injecting air impulses under pressure into pulsing chambers disposed underneath the deck sections and respectively individual to such deck sections, such pressure impulses propagating through the material bed moving along the deck sections and flowing into a pulsing chamber above the deck sections which is common thereto (in the prior structures the dust hood), and withdrawing air likewise in impulsing manner during the intervals between the pressure impulses, from the individual pulsing chambers underneath the deck sections, thereby successively relaxing the air pressure above and below the material bed and coincidentally momentarily reversing the impulsing air flow through the material bed. The material particles are in this manner subjected to a true air jigging operation benefitting the fluidity of the bed and facilitating orientation of the particles for discharge in accordance with their specific gravities.

The control means for producing the alternate pressure impulses and pressure relaxation impulses comprises, in accordance with another feature, air inlet and air outlet manifolds connected with the individual pulsing chambers extending downwardly from the deck sections, these manifolds being respectively interconnected with the pressure and suction sides of a fan. The impulsing pressure air flow from the intake manifold to the pulsing chambers is controlled by rotating intake valves, one for each pulsing chamber, and the impulsing withdrawal of air from the pulsing chambers to the outlet manifold and thence to the intake or suction side of the fan is controlled by similar rotating outlet valves, one for each pulsing chamber. The outlet valves are displaced by 90° relative to the inlet valves. Accordingly, when the inlet valves are open, the outlet valves are closed, and air pressure impulses will be injected into the pulsing chambers underneath the deck sections, followed by closing of the inlet valves and opening of the outlet valves, to allow impulsewise withdrawal of air from such pulsing chambers, consequently relaxation of air pressure underneath and above the deck sections and the material bed thereon. The rotation of the inlet and outlet valves produces in this manner alternate momentary air pressure and pressure relaxation impulses to subject the particles therein to the air jigging mentioned before.

In accordance with another feature of the invention, there are provided perforated air diffusion plates in the intake and also in the outlet manifolds, subdividing such manifolds into compartments corresponding to the pulsing chambers into which air is to be injected and from which air is alternately withdrawn in pulsing manner. The purpose of these air diffusion plates is to distribute the air relatively to the pulsing chambers in accordance with the needs of the deck sections respectively connected with the pulsing chambers.

The fan used in accordance with a further feature of the invention is of a type which combines the functions of an impeller-exhauster and dust precipitator in a single unit, that is, it is adapted to circulate air and to separate dust and fines entrained in the intake air stream. This operation is utilized to precipitate dust and fines entrained in the exhaust air stream from the separator into a collector hopper disposed underneath the fan. A unit distributed by American Filter Company, Inc., Louisville, Kentucky, under the name Roto-Clone has been found suitable. Separate dust and fines collection means including a separator, for example, of the cyclone type, is in this manner eliminated. In the new system, the fan, for example, of the Roto-Clone type, is accordingly used for the three-fold purpose, namely, first, to supply air to the airflow separator, second, to withdraw air with entrained dust and fines therefrom, and third, to separate the dust and fines from the withdrawn air, thereby cleaning the air and reinjecting the cleaned air into the airflow separator.

The duct leading from the air outlet manifold of the airflow separator to the intake side of the fan is in accordance with still another feature of the invention provided with an adjustable air intake for allowing fresh air to enter into the system in adjustable amounts, in the form of air pressure impulses, for the purpose of regulating the pressure produced by such impulses.

The foregoing and other objects and features of the invention will appear from the description which will presently be rendered with reference to the accompanying diagrammatic drawings showing an embodiment to give an example. In these drawings, Fig. 1 shows the principal elements or components of a system according to the invention;

Fig. 2 illustrates in perspective view, partly broken away to show details, control elements, including inlet and outlet manifolds and respectively associated inlet and outlet valves as well as the pulsing chambers terminating underneath the deck section;

Fig. 3 shows the apparatus in side elevational view with some parts broken away to indicate details; and Fig. 4 represents an end view of the apparatus as seen when looking in the direction of the arrows along line 4—4 in Fig. 3.

Referring now to the drawings, the system comprises a separator generally indicated by numeral 10, which may be an airflow separator generally constructed along the lines of the airflow separator described in the previously mentioned Patent No. 2,513,960. Underneath the operating parts of the separator 10 and forming part thereof is disposed a boxlike structure 12, having an extension 13 which in the present case contains partitions 14/15, 16/17 and 18 (Fig. 3) forming upwardly directed ducts or pulsing chambers, one for each of three deck sections of the airflow separator. Only single partitions 14/15 and 16/17 are shown in Fig. 2. The partition 18 and separator parts forwardly extending therefrom as shown in Fig. 3 have been omitted from Fig. 2 to keep it simple. Following each deck section is an intermediate discharge as indicated at 19, 20, 21 (Figs. 3 and 4) for removing particles separated on the respective deck sections. The pulsing chambers extend downwardly from underneath the respective deck sections by way of the box extension 13 and are connected with inlet and outlet valves contained in casings indicated at 22, 23 and the latter communicate with respectively associated air inlet and outlet manifolds indicated at 24, 25. The air inlet manifold 24 and associated air inlet valves in casings 22 are disposed along one side of the extension 13 of the box 12 containing the partitions 14/15, 16/17 which form the pulsing chambers, and the air outlet manifold 25 and associated air outlet valves in the casings 23 are disposed along the other side thereof. The box extension 13 extends the box structure 12 in downward direction in the case of installations where the control means including the manifolds and the valves and fan are disposed on a separate lower floor level underneath the separator proper. The box extension 13 may be dispensed with if all equipment is disposed on the identical floor level.

The air inlet manifold 24 is connected with the pressure side of a fan 30 by way of a duct 31 and the air outlet manifold 25 is connected with the suction side of the fan by way of a duct 32. The fan 30 is operated by suitable known motor means (not shown) to supply a continuous stream of air to the intake manifold 24 while continuously attempting to withdraw air from the outlet manifold 25. The air is, however, injected in the form of spaced pressure impulses and withdrawn in similar impulsing manner during the intervals between the injected impulses under the control of the valves contained in the casings 22 and 23, which will presently be described.

At a suitable and desired point there is provided an intake hole 35 in the duct 32 leading from the air outlet manifold 25 to the suction side of the fan 30. An adjustable lid or cover 36 is provided for closing and opening the intake hole 35 more or less, as desired, so as to permit fresh air to enter the system in adjusted amounts by way of the suction side of the fan, to regulate the pressure of the air impulses injected. It will be clear that the intake of fresh air may thus be adjusted as desired, a greater amount of fresh air admitted increasing the pressure produced by the air impulses and lesser amounts of fresh air admitted correspondingly reducing the impulse pressure.

As mentioned before, the fan 30 functions to circulate air and to separate fines and dust entrained in the air stream withdrawn from the separator and entering its suction side by way of the duct 32. This operation is utilized by the invention which provides a hopper 40 into which the dust and fines are precipitated. The hopper may be provided with a known air lock 41 (Fig. 1) to prevent undesired loss of air from the system with the dust and fines discharged from the hopper for disposal as desired.

Having explained the principal elements or components of the system and their general functions, the means for controlling the impulsewise injection and withdrawal of air will now be described more in detail.

The air intake manifold 24 contains perforated partitions indicated at 45 and 46 and the air outlet manifold 25 contains similar perforated partitions 48 and 49. These partitions constitute the air diffusion plates which subdivide each manifold into three communicating compartments corresponding to the three pulsing chambers formed by the partitions 14/15 and 16/17 in the box 12/13. Each manifold compartment communicates with one of the adjacently disposed valves and the corresponding valve is in communication with the respectively associated upwardly extending pulsing chamber. Thus, there is an opening 50 providing communication between the centrally disposed air intake compartment defined in the intake manifold 24 by the diffusion plates 45 and 46 and the casing defined by walls 51, 52 containing the centrally disposed intake valve 53, an opening 54 being formed in the connecting wall leading into the centrally disposed pulsing chamber extending between the partitions 14/15 and 16/17 in the box 12/13. The two compartments at the opposite ends of the intake manifold 24 communicate similarly with intake valves disposed on either side of the central casing including the walls 51, 52 containing the central valve 53, and the casings housing these end valves communicate respectively with the correspondingly disposed pulsing chambers through openings indicated at 55, 56. The outlet control means positioned along the other side of the extension box 13 are symmetrically similarly arranged. Accordingly, there are three outlet valves, each in a separate casing formed by walls such as indicated at 57 and 58 which are the end walls of the centrally positioned casing containing the central outlet valve 59, such outlet valve communicating through an opening 60 with the centrally positioned pulsing chamber defined by the partitions 14/15 and 16/17 and also communicating through an opening 61 with the correspondingly centrally positioned air outlet compartment defined by the perforated diffusion plates 48 and 49 disposed in the outlet manifold 25. Numerals 62 and 63 indicate openings similar to the opening 61 providing communication between the two end compartments in the outlet valves disposed spaced from either end of the centrally disposed outlet valve 59.

It will be seen from the foregoing explanations that each pulsing chamber has its individual inlet and outlet valve and each such valve has its individual compartment disposed respectively in the corresponding inlet and outlet manifold. Thus, summarizing, the centrally positioned pulsing chamber defined by the partitions 14/15 and 16/17 has an individual inlet valve 53 which is in communication through the opening 50 with the centrally positioned compartment of the inlet manifold 24, defined by the air diffusion plates 45 and 46, and also has an individual outlet valve 59 which is in communication with the centrally positioned compartment of the outlet manifold 25, defined by the diffusion plates 48 and 49. Each of the remaining two pulsing chambers extending adjacent the central pulsing chamber has in similar manner inlet and outlet valves and respectively associated inlet and outlet manifold compartments individual thereto.

Each inlet valve, disposed in an individual casing comprises a vane such as 53 (Figs. 2 and 4) mounted midway thereof on a rotatable shaft 65. Baffles 66, 67 are disposed within the corresponding valve casing. Each outlet valve, similarly disposed within its individual casing, comprises a similar vane such as 59 mounted midway thereof on a rotatable shaft 70. Baffles such as 71, 72 are disposed in each outlet valve casing in similar manner as they are disposed in each inlet valve casing. Valves of this type are of course butterfly valves but are frequently also referred to as fluttervalves. The vanes 53 of the inlet valves are angularly displaced by 90° relative to the vanes 59 of the outlet valves, as is particularly apparent from Fig. 4.

Accordingly, when the inlet valves 53 are in the position shown in Figs. 2 and 4, air from the respectively associated compartments of the inlet manifold 24 will be injected in the form of air impulses into the three upwardly extending pulsing chambers within the box 12/13 which terminate respectively underneath three individual deck sections in the airflow separator 10 shown in side view in Fig. 3. The air outlet valves 59 are at that instant in closed position, as shown in Figs. 2 and 4, and air accordingly cannot be withdrawn from the three pulsing chambers while air is injected thereinto. The conditions are momentarily reversed an instant later, that is, the inlet valves 53 will be in closed position, preventing injection of air, while the outlet valves 59 will be open, allowing withdrawal of air from the pulsing chambers. The continued interplay between the inlet and outlet valves, responsive to rotation of the shafts 65, 70, produces in this manner successive air pressure impulses which are injected into the pulsing chambers, alternating with successive impulsewise withdrawal of air from the pulsing chambers. The pressure impulses propagate through the material bed on the respective deck sections of the airflow separator 10, exerting a lifting action on the material particles, and flow into the common pulsing chamber formed by the hood 80 (Figs. 3 and 4) above the decks and material bed moving therealong. The impulsewise withdrawal of the air from the pulsing chamber relaxes the air pressure momentarily during the intervals between the air impulses injected, causing momentary impulsewise reversal of the air current from the common impulse chamber on top (hood 80) downwardly through the material bed on the deck sections, while air is impulsewise withdrawn at the bottom of the pulsing chambers through the outlet valves. This reciprocating action of the air impulses subjects the particles to a true air jigging, that is, to a more intense and more effective pneumatic agitation as compared with the agitation of unidirectional impulses as they are produced in prior systems.

The means for rotating the valve shafts 65 and 70 comprises a motor 85 driving a chain 86 which drives one of the shafts, for example, the shaft 70, the latter driving a chain 87 which in turn rotates the shaft 65. Each shaft 65 and 70 is subdivided into sections, one for each valve, such sections being interconnected by couplings such as 90 as indicated in Fig. 3.

As has been said before, each pulsing chamber extending upwardly within the box 12/13 terminates underneath an individual deck section. Thus, the right hand pulsing chamber (Fig. 3) defined by the end wall of the box 13 and the partition 15 (frontally disposed pulsing chamber as seen in Fig. 2) terminates underneath the rearmost right hand feed receiving deck section of the airflow separator (Fig. 3) associated with the intermediate discharge 19; the centrally disposed pulsing chamber defined by the partitions 14 and 17 (Fig. 3) corresponding to partitions 14/15 and 16/17 in Fig. 2, terminates underneath the next successive deck section associated with the intermediate discharge chute 20; and the third pulsing chamber defined by the partitions 16, 18 in Fig. 3 (rearmost pulsing chamber as seen in Fig. 2) terminates similarly underneath the third deck section of the airflow separator which is associated with the intermediate discharge 21.

The three successive deck sections require a different air supply in accordance with the need of the material particles massing thereon. The rearmost feed receiving deck section associated with the intermeidate discharge chute 19 receives the row material stream from an oscillating feed gate 95 operated by an arm 96 actuated by a motor 97 through suitable means such as a chain 97'. This first, feed receiving deck section needs a larger amount of air than the next successive deck sections associated respectively with the intermediate discharge chutes 20 and 21, because the bed forming on this first deck section contains raw coal intermingled with all impurities, that is, heavy particles such as rock, slate, middlings and the like. The heaviest impurities are separated on the first deck section and removed by way of the intermediate discharge chute 19, the remainder containing impurities such as coarse middlings and the like moving to the second deck section supplied by air impulses from the centrally disposed pulsing chamber. Such second deck section accordingly needs less air than the first deck section. The impurities such as coarse middlings are separated on the second deck section and removed by way of the intermediate discharge 20, the remainder which is substantially free of the heaviest impurities, but still containing some lighter impurities, moving along the third deck section supplied with air from the associated third pulsing chamber. Such third deck section needs less air than the preceding deck sections. In other words, the successive deck sections, as seen in the direction of the flow of the material bed thereon, need progressively less air to separate the impurities contained in the material flowing thereon.

This different need for air of the different deck sections is supplied by the provision of the air diffusion plates 45, 46 in the air inlet manifold. The air stream injected into the first compartment of the inlet manifold 24 is somewhat impeded in its flow into the second centrally disposed compartment by the diffusion plate 45, and the air flowing from the central compartment into the third compartment is similarly somewhat impeded by the diffusion plate 46. It follows, therefore, assuming that the air inlet valves 53 are in open position, that the three pulsing chambers respectively communicating with the three air inlet manifold compartments will receive progressively lesser amounts of air, and inasmuch as these pulsing chambers terminate underneath the corresponding deck sections, these deck sections will receive different amounts of air according to their needs. The impulsewise withdrawal of air from the three pulsing chambers proceeds similarly due to the provision of the diffusion plates 48, 49 in the air outlet manifold 25. The diffusion plates regulate in this manner the supply of air to the different deck sections and removal of air from these deck sections in accordance with the individual needs of such deck sections.

The remaining apparatus of the airflow separator 10 includes intermediate discharge gates 101, 102, 103 for moving separated material particles into the intermediate discharge chutes 21, 20, 19 and means for oscillating the discharge gates from a common drive 104 actuated by a motor 98 over a gear reducer 100 through suitable drive means shown as chains 98' and 100'. Numerals 105, 106, 107, 108 indicate sight windows for observing the progress of the material bed on the various deck sections. The raw feed is delivered to the feed gate 95 at 109. Coal, freed of impurities is discharged at the forward left end of the decks at 110. Means for mechanically agitating the material decks may be provided if desired. Further details of the airflow separator may be had by consulting the previously mentioned patent and references cited therein.

The inlet and outlet valves may be rotated at speeds from about 55 R. P. M. to about 165 R. P. M. providing respectively for 110 to 330 impulses per minute. Measurements taken revealed pressures in the common pulsing chamber on top of the deck sections and in the pulsing chambers underneath the deck sections, for example, the rearmost pulsing chamber underneath the rearmost feed receiving section, on the order of 3.5" WG at 172 pulses per minute with a pressure obtaining in the dust receiving hopper 40 on the order of 11.5" WG. The maximum pressure reading in the pulsing chambers, with the fresh air intake 35 in the suction line to the fan wide open was found to be on the order of 6" WG; the minimum pressure reading with the intake 35 closed was 1" WG. These data are merely given as examples.

The inlet valves 53 and the outlet valves 59 have been shown for convenience in identical angular position and displaced relative to each other by 90°. It will be understood of course that the inlet valves may be set angularly apart; for example, the inlet valve for the centrally extending pulsing chamber may be set 120° displaced relative to the inlet valve for the pulsing chamber terminating underneath the rearmost feed section of the deck and the inlet valvet for the pulsing chamber terminating underneath the deck section provided with the intermediate discharge 21 may be similarly angularly displaced by 120° relative to the centrally disposed inlet valve. The angular setting of the outlet valves may be similar, each outlet valve being displaced by 90° relative to its cooperating inlet valve. Such angular setting of the valves, 120° has been mentioned as an example only, will reduce the power required for operation because the pulsing chambers will be successively supplied with air instead of simultaneously. The angular setting of the valves may in short be as desired to give the best results for any particular run of material.

Another modification that may be made relates to the valve housing and particularly to the size of the openings provided by shields 66/67 and 71/72, respectively, which communicate respectively with the openings 54, 55, 56 and 60. The shields may be provided with adjustable extensions for regulating the size of the corresponding openings, thereby changing the closing/opening interval of the valve operation.

The inlet and outlet air ducts have been shown as connected to the corresponding manifolds at the ends thereof. It is understood of course that these ducts may be connected to the manifolds as desired, for example, at the sides or at the bottom thereof.

The mechanical jigging of the deck or deck sections may be eliminated or applied as may be desired. It has been found that the air jigging alone as described is sufficient for most materials treated.

Changes may accordingly be made within the scope and spirit of the appended claims in which is defined what is believed to be new and desired to have protected by Letters Patent.

I claim:

1. In combination with apparatus for separating by the application of air impulses heterogeneously intermixed material particles in accordance with the specific gravities thereof, said apparatus comprising successively spaced and inclined perforate decks for supporting a flowing stream of material particles to be separated thereon and having means for discharging separated particles from each deck, a device for producing air impulses to act upon said stream upon said decks for the purpose of causing said particles therein to stratify for discharge therefrom, said device comprising a hood forming above said stream a substantially closed top pulsing chamber common to said decks, means forming underneath each of said decks a substantially closed bottom pulsing chamber, first control means for successively injecting into said bottom pulsing chamber spaced air impulses, and second control means for successively expelling air from said bottom pulsing chamber during the spacing intervals between said injected air impulses, said alternate injection of air and expelling of air producing in said bottom chamber variable pressure which is through said material stream propagated to said common top pulsing chamber for the purpose of pneumatically jigging the material particles to effect stratification thereof from each of said decks.

2. The structure and cooperation of parts according to claim 1, comprising simultaneously rotatable butterfly valves constituting said first and said second control means, the vanes of said valves being angularly displaced by 90 degrees so that responsive to rotation thereof one valve is closed while the other valve is open, a fan, and duct means for respectively interconnecting said valves with the pressure and suction sides of said fan.

3. The structure and cooperation of parts according to claim 2, comprising means for rotating said valves at speeds on the order of about 55 R. P. M. to 165 R. P. M. to produce a frequency of air impulses varying respectively from 110 to 330 impulses per minute.

4. In combination with apparatus for separating by the application of air impulses heterogeneously intermixed material particles in accordance with the specific gravities thereof, said apparatus comprising enclosed spaced and successive perforate decks for receiving a stream of material particles to be separated thereon and having means for discharging separated particles from each of said decks, a device for producing air impulses to act upon said stream for the purpose of causing the particles therein to stratify for discharge therefrom, said device comprising means forming underneath each of said decks a pulsing chamber, an air inlet and an air outlet valve for said pulsing chamber, a fan for supplying air under pressure to said inlet valve and for withdrawing air from said outlet valve, and means for successively opening one of said valves and simultaneously closing the other valve for the duration of each opening interval of said one valve.

5. Apparatus for separating heterogeneously intermixed material particles in accordance with the specific gravities thereof comprising means forming a plurality of successive inclined perforate decks, means for supplying a stream of material particles to flow along said decks, means forming above said decks a common pulsing chamber, means forming underneath each deck a pulsing chamber individual thereto, an air inlet common to said individual pulsing chambers, an air outlet common to said individual pulsing chambers, a fan, duct means for connecting the pressure and suction sides of said fan respectively with said air inlet and said air outlet, a plurality of inlet valves one for each individual pulsing chamber connected with said air inlet and a like plurality of outlet valves one for each individual pulsing chamber connected with said outlet, means for operating said fan to supply air under pressure continuously to said air inlet and to apply suction continuously to said air outlet, and means for actuating said inlet valves to open position for admitting air from said inlet to said individual pulsing chambers only during successive spaced intervals and for actuating said outlet valves simultaneously successively to closed position to prevent escape of air from said individual pulsing chambers to said outlet, and vice versa, to produce in said individual pulsing chambers successive pressure impulses which are propagated through said stream of material particles flowing along the respectively associated decks to said common pulsing chamber for the purpose of pneumatically jigging said particles on said decks to cause stratification thereof in accordance with their specific gravities, and means for discharging stratified particles from each deck.

6. Apparatus according to claim 5, comprising air diffusion means in said air inlet to regulate the supply of air to said individual pulsing chambers, and air diffusion means in said air outlet to regulate similarly the escape of air from such pulsing chambers to said outlet.

7. Apparatus according to claim 5, comprising means for admitting variable adjusted amounts of fresh air to the suction side of said fan to determine the amounts of air admitted to said individual pulsing chambers during each interval of opening of said inlet valves for the purpose of regulating the magnitude of the pressure of said pressure impulses.

8. Apparatus according to claim 5, comprising rotary butterfly valves constituting said inlet and said outlet valves, respectively, the vanes of said inlet valves being angularly displaced by 90 degrees with respect to the vanes of said outlet valves.

9. Apparatus according to claim 5, wherein said valves are actuated to supply air impulses at a frequency in excess of 100 pulses per minute.

10. Apparatus according to claim 5, wherein said valves are actuated to supply air impulses varying between about 110 and 330 pulses per minute.

11. Apparatus according to claim 5, comprising means for collecting dust particles entrained in the air impulses escaping from said individual pulsing chambers during the opening intervals of said outlet valves.

12. Apparatus according to claim 5, comprising rotary butterfly valves constituting said inlet and outlet valves, respectively, the vanes of said inlet valves being angularly displaced by 90 degrees with respect to the vanes of said outlet valves, means for simultaneously rotating said valves to supply air impulses varying between about 110 and 330 pulses per minute, air diffusion means in said air inlet to regulate the supply of air to said individual pulsing chambers, air diffusion means in said air outlet to regulate similarly the escape of air from said individual pulsing chambers, means for admitting variable adjusted amounts of fresh air to the suction side of said fan to determine the amounts of air admitted to said individual pulsing chambers during each interval of opening of said inlet valves for the purpose of regulating the magnitude of the pressure of said pressure impulses, and means for collecting dust particles entrained in the air impulses escaping from said indivdual pulsing chambers during the opening intervals of said outlet valves.

13. Apparatus according to claim 5, wherein said valves are mutually angularly displaced.

14. Apparatus according to claim 5, comprising means for regulating the operatively effective closing and opening intervals of said valves.

References Cited in the file of this patent

UNITED STATES PATENTS

| 1,976,292 | Peale | Oct. 9, 1934 |

FOREIGN PATENTS

| 808,429 | France | Nov. 14, 1936 |
| 393,981 | Great Britain | June 16, 1933 |